United States Patent
Barrow

(10) Patent No.: US 11,824,269 B2
(45) Date of Patent: Nov. 21, 2023

(54) IN-EAR MONITOR AND TRANSCEIVER SYSTEM

(71) Applicant: Nathaniel F Barrow, Sherman Oaks, CA (US)

(72) Inventor: Nathaniel F Barrow, Sherman Oaks, CA (US)

(*) Notice: Subject to any disclaimer, the term of this patent is extended or adjusted under 35 U.S.C. 154(b) by 0 days.

(21) Appl. No.: 17/581,750

(22) Filed: Jan. 21, 2022

(65) Prior Publication Data
US 2023/0238715 A1 Jul. 27, 2023

(51) Int. Cl.
H01Q 21/28 (2006.01)
H04B 1/18 (2006.01)
H04W 4/80 (2018.01)

(52) U.S. Cl.
CPC ............ H01Q 21/28 (2013.01); H04B 1/18 (2013.01); H04W 4/80 (2018.02); H04R 2420/07 (2013.01)

(58) Field of Classification Search
CPC . H01L 29/78; H01L 21/76897; H01L 23/535; H01L 29/20; H01L 29/401; H01L 29/423; H01L 29/49; H01L 29/4966; H01L 29/66356; H01L 29/66477; H01L 29/66545; H01L 29/7391; H01L 29/0638; H01L 29/0653
See application file for complete search history.

(56) References Cited

U.S. PATENT DOCUMENTS

| | | | |
|---|---|---|---|
| 10,827,455 B1* | 11/2020 | Agrawal | H04R 1/1041 |
| 2006/0286933 A1* | 12/2006 | Harkins | H04W 84/10 |
| | | | 455/41.2 |
| 2010/0284545 A1* | 11/2010 | Dietz | H04R 5/027 |
| | | | 381/79 |
| 2021/0289282 A1* | 9/2021 | Onizuka | H02J 50/10 |

* cited by examiner

Primary Examiner — Eugene Yun
(74) Attorney, Agent, or Firm — Plager Schack LLP; Mark H. Plager; Alexis Saenz

(57) ABSTRACT

A monitor system is provided for wireless communication between a message source and a wearer needing guidance or information from the message source. The monitor system includes a wireless earpiece speaker device. A short-range radio receiver is coupled to the earpiece device. A transceiver in the system includes a long-range radio frequency receiver to receive a long-range radio frequency signal from an ultrahigh frequency (UHF) band source or a very high frequency (VHF) band source. The transceiver also includes a short-range transmitter module that converts the long-range radio frequency signal into a short-range radio frequency signal and communicates the short-range frequency signal to the earpiece speaker device.

10 Claims, 4 Drawing Sheets

IN-EAR MONITOR AND TRANSCEIVER SYSTEM

CROSS-REFERENCE TO RELATED APPLICATIONS

None.

BACKGROUND

The embodiments herein relate generally to audio systems, and more particularly to an in-ear monitor and transceiver system.

Currently, there are two solutions for discreet in ear monitoring. One includes proprietary digital transmission from expensive base stations that offer little range. The other is through induction loops worn around the neck that lack audio fidelity.

The prior art systems require wired power. In addition, the frequency during operation is usually fixed. Volume once a device is in their ear is usually fixed or controlled by another point in the system other than by the wearer.

SUMMARY

In one aspect of the subject disclosure, a monitor system is provided. The monitor system includes a wireless earpiece speaker device. A short-range radio receiver is coupled to the earpiece device. A transceiver in the system includes a long-range radio frequency receiver to receive a long-range radio frequency signal from an ultrahigh frequency (UHF) band source or a very high frequency (VHF) band source. The transceiver also includes a short-range transmitter module that converts the long-range radio frequency signal into a short-range radio frequency signal and communicates the short-range frequency signal to the earpiece speaker device.

In another aspect, a monitor system is provided that includes a wireless earpiece speaker device. A short-range radio receiver is coupled to the earpiece device. A transceiver includes a long-range radio frequency receiver to receive a long-range radio frequency signal from an ultrahigh frequency (UHF) band source or a very high frequency (VHF) band source, and a short-range transmitter to convert the long-range radio frequency signal into a short-range radio frequency signal and communicate the short-range frequency signal to the earpiece speaker device. The short-range transmitter of the transceiver is programmable to operate in a frequency range between 2.40 GHz to 2.48 GHz. The transceiver also includes a volume control interface configured to control a volume of the short-range radio frequency signal communicated to the earpiece device, a clip to mount the transceiver to an article of clothing on a wearer of the earpiece device, a battery port to receive one or more batteries, and a battery level display indicating a current power level of the one or more batteries.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
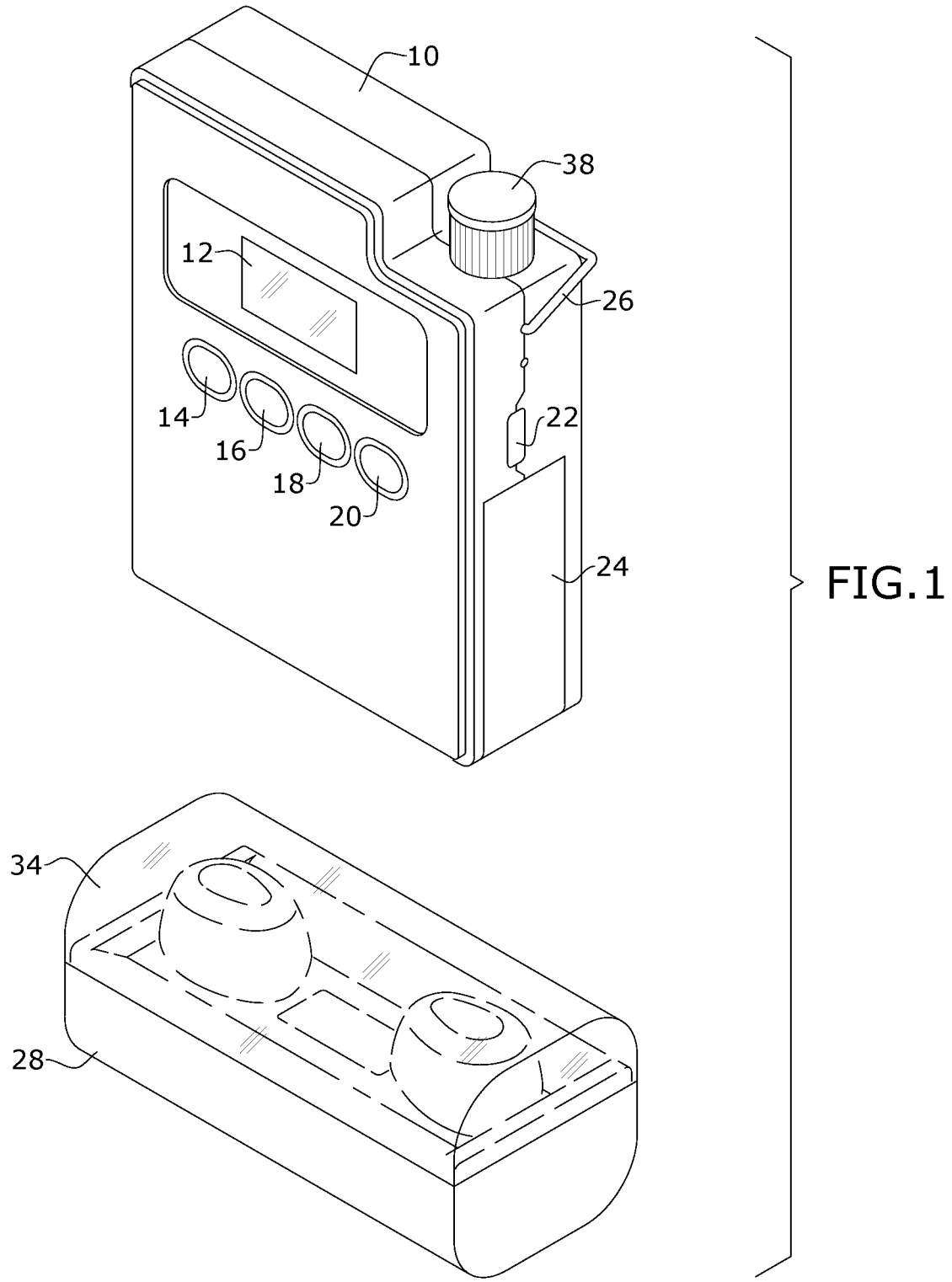
FIG. 1 is a front perspective view of an in-ear monitor transceiver system in accordance with an illustrative embodiment.
Figure 2:
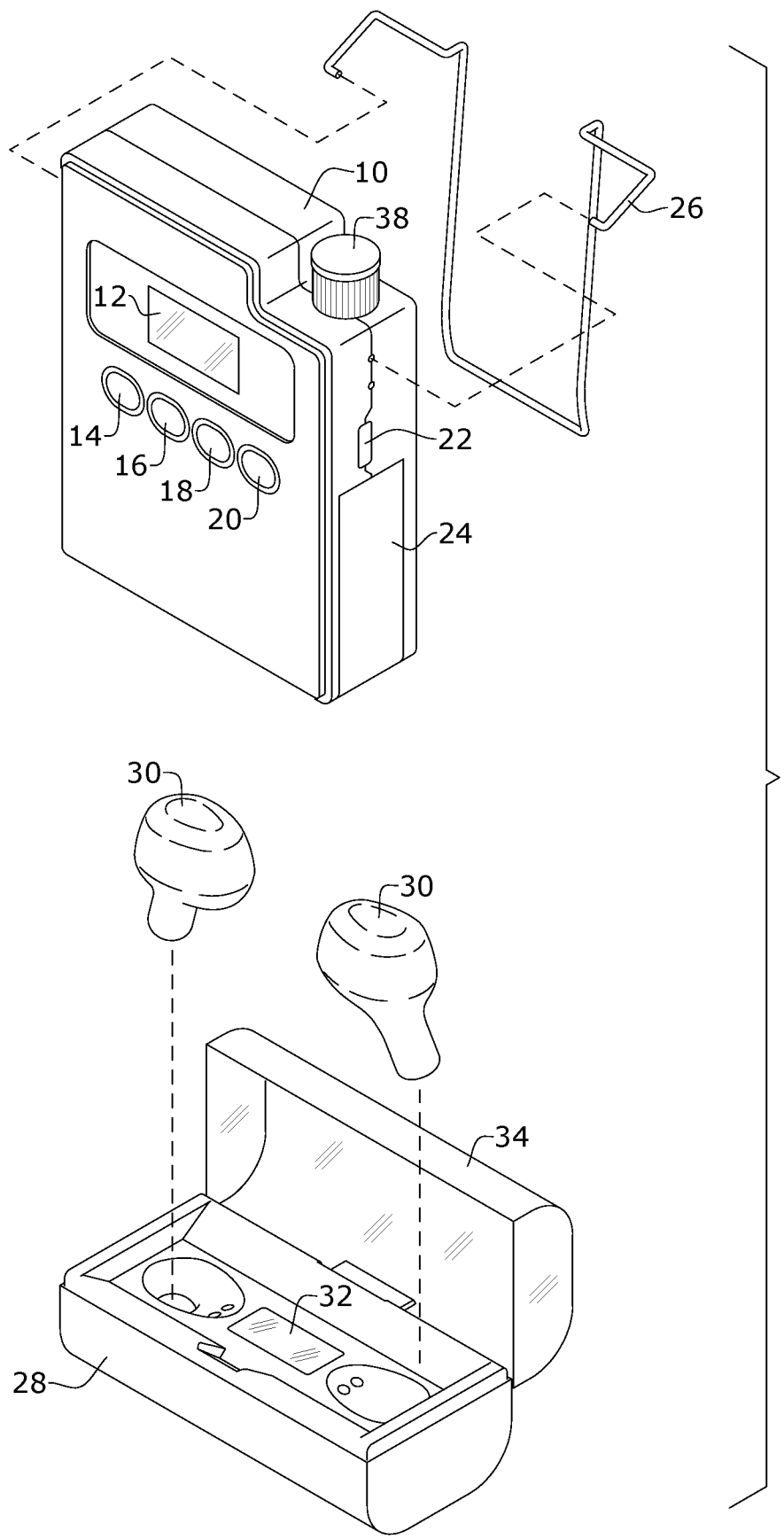
FIG. 2 is an exploded view of the system of FIG. 1.
Figure 3:
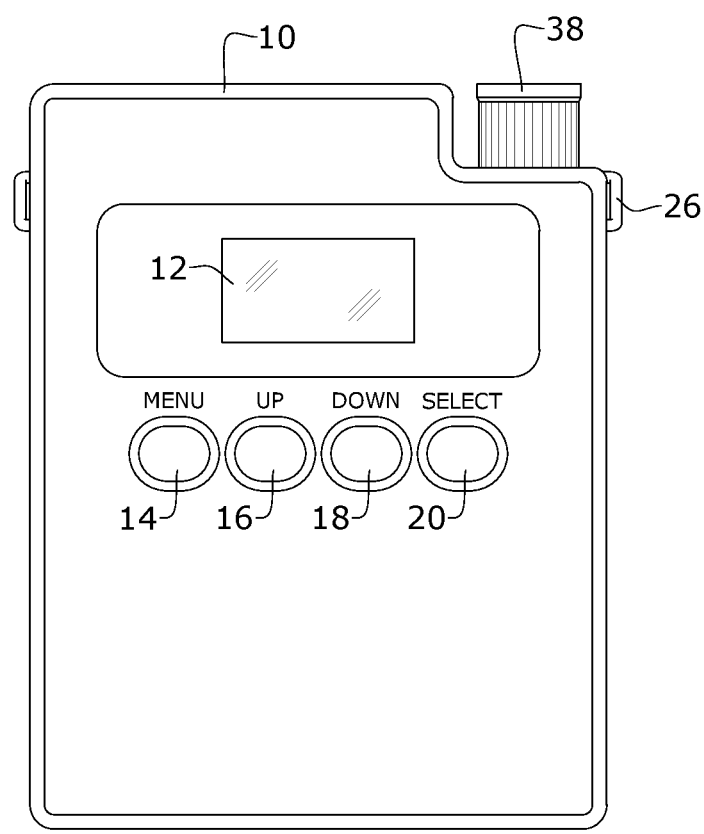
FIG. 3 is a front view of a transceiver of the system of FIG. 1 according to an illustrative embodiment.
Figure 4:
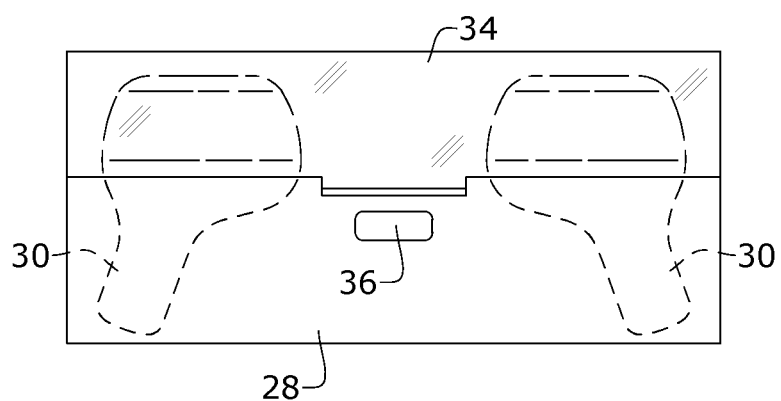
FIG. 4 is a rear view of a charging case showing in-ear monitors according to an illustrative embodiment.

Embodiments disclosed herein generally provide a monitor system. Aspects of the subject technology may be useful in fields that generally use aided speaking performances. Some examples of uses include on-air and on-stage talent (for example, broadcast live television, acting, or music performances), corporate speaking, guided tours, logistical and security specialties, medical training, and sports related professionals. Some features that may be appreciated include small size and discreet structure of the earpiece, near invisibility to invisibility of the components to an audience, flexibility in distance of signal during operation, volume control, power level monitoring, and rechargeability.

As will be appreciated by those of ordinary skill in the art, the above-mentioned features address long felt needs in the industry. Many occupations or events require a monitoring system to be worn by a user so that messages and directions are provided to the user. The user is typically engaged in an act that requires the audience to pay attention to what the user is doing or addressing. Current monitoring systems are generally wired and/or bulky so they are discernible when worn, which distracts the audience from the act on hand. In some cases, for example involving actors, current monitoring systems lose the illusion of the scene because the earpiece, wiring, and/or receiver are apparent and not germane to the scene. In addition, some conventional technology is unreliable because the earpiece relies on battery power that is assumed to be fully charged for use. However, there is a lack in confirming whether the equipment is sufficiently charged for use, especially in the field or during a scene. When equipment fails due to loss of power, the entire crew must wait for the equipment to be changed out. This usually involves changing out the earpiece, receiver pack, and wiring since they may operate as a connected set. Other limitations of the conventional technology involve range. Generally, a conventional monitoring system that requires the wearer to be far from a radio transmitter needs a wired connection between the receiver and earpiece because long range applications require a long-range SPECfrequency receiver. Earpieces conventionally are not configured for short range reception which would require a substantial redesign in the electronic of an earpiece. As is known by those in the art, short-range reception is inoperable at distances generally beyond 30 feet (10 meters). Elements of the subject technology address these issues.

As will be appreciated, in one aspect of the subject technology, the system overcomes the limitations currently in the art by including a transceiver pack that is configured to receive long-range frequency signals and convert the long-range signals into a short-range signal that can be wirelessly transmitted to the earpiece. The transceiver is wearable under clothing so that the device is not visible to the viewing audience. Moreover, the earpiece is discreetly within the wearer's ear away from view and there is no visible cord dangling between the two devices that one normally sees in the conventional technology.

Figure 5:
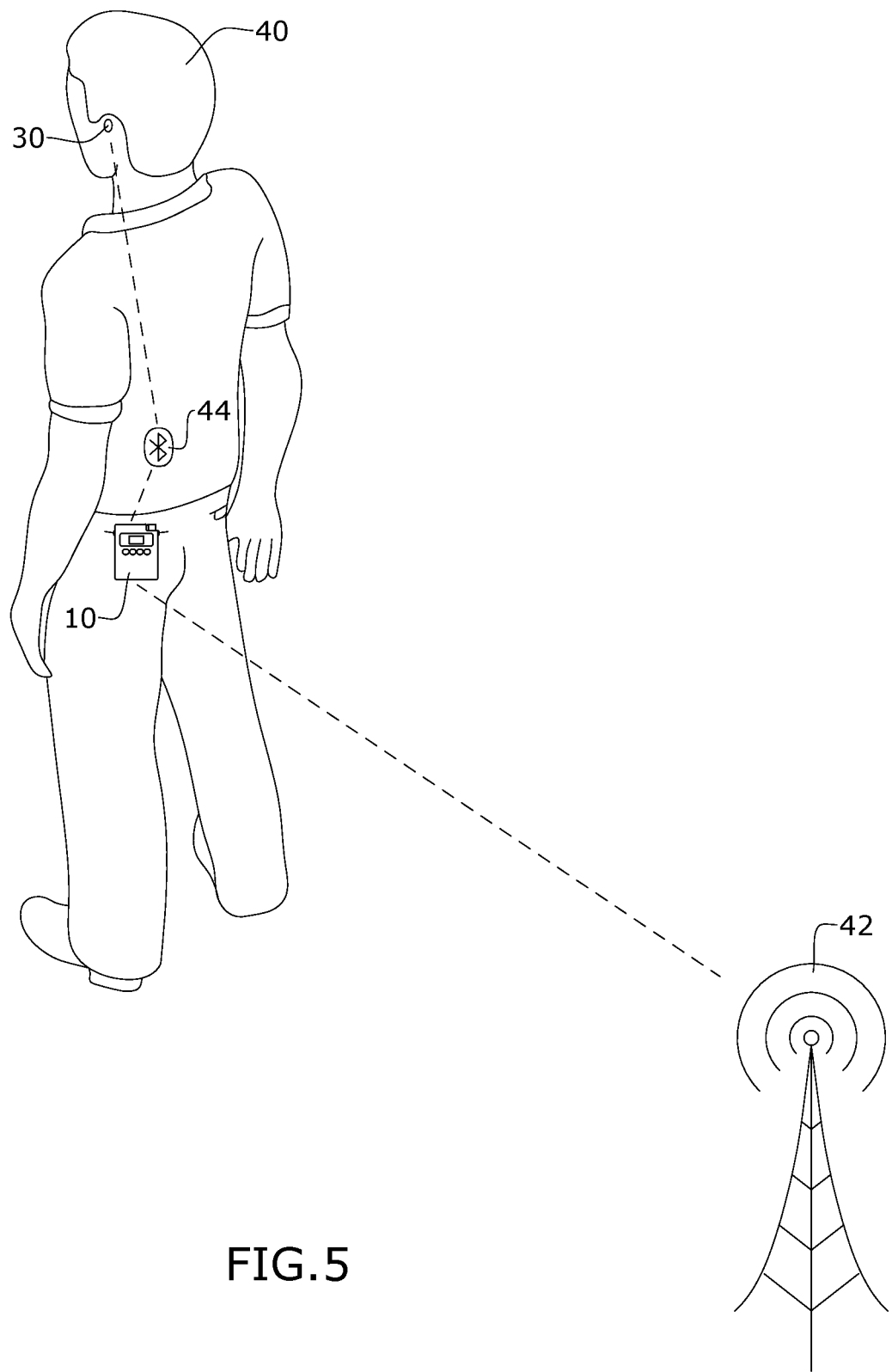
FIG. 5 is a diagrammatic view of the system of FIG. 1 in use according to an illustrative embodiment.

Referring now to the Figures, an in-ear monitoring system is shown according to an illustrative embodiment. As shown in FIGS. 1 and 5, in one embodiment, the system generally includes a transceiver module 10 and one or a pair of wireless earpieces 30. The transceiver 10 is configured to be worn on a user 40. The transceiver 10 is configured to receive a radio signal in one frequency range and convert that signal into another frequency range for transmission to the earpiece(s) 30. For example, the transceiver 10 may include a receiver component that operates in long-range radio frequencies. Long-range frequencies may be for example, an ultrahigh frequency (UHF) band source or a very high frequency (VHF) band source. The long-range frequency radio signal is represented as element 42 in FIG. 5. A converter circuit in the transceiver module 10 is configured to convert the incoming long-range radio frequency into a short-range radio frequency (represented as element 44 in FIG. 5). In one illustrative embodiment, the conversion circuit converts the long-range radio frequency into a range between 2.40 GHz-2.48 GHz. The earpiece(s) 30 may include a receiver component configured for reception in the same frequency range as the transceiver module 10 transmitter. The transmitter component may then transmit the short-range radio signal to the earpiece(s) 30, which are generally on the same person wearing the transceiver module 10, and thus within the operable distance of the short-range frequency signal. As will be appreciated, these features provide an embodiment that reliably transmits monitoring messages to users 40 even when those users may be miles from the message source while discreetly placing the receiving elements out of the audience's view. On large scale move sets for example, an actor can now be placed remotely from the camera position while still in shot and the need to edit the wire emanating from an earpiece the actor's ear is unnecessary.

Referring now to FIGS. 1-4, additional details of the system are shown according to illustrative embodiments. The transceiver module 10 may include in some embodiments, a graphics display 12. The transceiver module 10 may include a battery port 24 for receiving one or more batteries. In some embodiments, the internal electrical circuit (not shown) may include a power level monitor for the current battery level. Some embodiments may include one or more function buttons. In an illustrative embodiment, the transceiver module 10 includes a menu button 14 that allows the user 40 to scroll through different functions that are shown in the graphics display 12. Up button 16 and down button 18 provide the scrolling functionality seen in the display 12. A select button 20 provides confirmation of a menu item selected. In an illustrative embodiment, the menu button 14 includes one or more frequency range programming functions. For example, the reception range of the earpiece(s) 30 may be selected through wireless programming from the transceiver module 10. The reception frequency of the transceiver module 10 may be programmed so that the device is tuned into the frequency from a local transmission source. As such, users may program the transceiver module 10 and earpiece(s) 30 for a desired channel to avoid interference/conflict with other nearby frequencies being used.

The transceiver module 10 may include a volume control 38. In an illustrative embodiment, the volume control 38 may be a dial that provides fine tune adjustment. The graphics display 12 may show the current volume level that the user 40 will hear in the earpiece(s) 30. Some embodiments may include a USB port 22. In an illustrative embodiment, the transceiver module 10 may include a clip 26 for attaching the transceiver module 10 to an article of clothing on the user 40. See for example, FIG. 5. The clip 26 may be a spring type that can slide for example, over an edge of clothing. As shown, the clip 26 may slide into a user's pocket. However, it will be understood that the user 40 may prefer to attach the transceiver module 10 in other ways that may make it easier to hide the transceiver module 10 while worn.

Some embodiments of the system may include a charging case module 28. The charging case module 28 may be configured for storage of the earpiece(s) 30. Some embodiments of the charging case module 28 are configured for power charging. The earpiece(s) 30 may be charged when docked in the charging case module 28. In some embodiments, the charging case module 28 may include a self-contained power source (for example a battery pack). Some embodiments include a USB port 36. A USB cable connected to an external power source may plug into the USB port 36 to power the docked earpiece(s) 30, or alternatively, to charge the internal power source. Some embodiments of the charging case module 28 may include a digital display 32 that shows the current charge level of the earpiece(s) so that users are not caught off-guard by an inadequate charge level of the system. A lid 34 may protect the earpiece(s) 30.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A monitor system, comprising:
a wireless earpiece speaker device;
a short-range radio receiver coupled to the earpiece device; and
a transceiver including:
a long-range radio frequency receiver configured to receive a long-range radio frequency signal from an ultrahigh frequency (UHF) band source or a very high frequency (VHF) band source,
a short-range transmitter module, and
a converter circuit in the transceiver configured to convert the long-range radio frequency signal into a short-range radio frequency signal, wherein the short-range transmitter module is configured to communicate the short-range radio frequency signal converted from the long-range radio frequency signal to the earpiece speaker device.

2. The monitor system of claim 1, further comprising a charging pack module configured to receive the earpiece device and charge power into the earpiece device.

3. The monitor system of claim 2, further comprising a graphics display on the charging pack module configured to display a current power level of the earpiece device in the event the earpiece device is docked in the charging pack module.

4. The monitor system of claim 1, wherein the short-range transmitter module of the transceiver operates in a frequency range between 2.40 GHz to 2.48 GHz.

5. The monitor system of claim 1, further comprising a clip on the transceiver, wherein the clip is configured to mount the transceiver to an article of clothing on a wearer of the earpiece device.

6. The monitor system of claim 1, further comprising a volume control interface on the transceiver configured to control a volume of the short-range radio frequency signal communicated to the earpiece device.

7. The monitor system of claim 1, further comprising a battery port on the transceiver configured to receive one or more batteries.

8. The monitor system of claim 7, a battery level display indicating a current power level of the one or more batteries.

9. The monitor system of claim 1, wherein the transceiver is programmable for an operating frequency of the short-range radio frequency signal.

10. A monitor system, comprising:
a wireless earpiece speaker device;
a short-range radio receiver coupled to the earpiece device; and
a transceiver including:
   a long-range radio frequency receiver configured to receive a long-range radio frequency signal from an ultrahigh frequency (UHF) band source or a very high frequency (VHF) band source,
   a short-range transmitter module,
   a converter circuit in the transceiver configured to convert the long-range radio frequency signal into a short-range radio frequency signal, wherein the short-range transmitter module is configured to communicate the short-range radio frequency signal converted from the long-range radio frequency signal to the earpiece speaker device, and wherein the short-range transmitter module of the transceiver is programmable to operate in a frequency range between 2.40 GHz to 2.48 GHz,
a volume control interface configured to control a volume of the short-range radio frequency signal communicated to the earpiece device,
a clip, wherein the clip is configured to mount the transceiver to an article of clothing on a wearer of the earpiece device,
a battery port configured to receive one or more batteries, and
a battery level display indicating a current power level of the one or more batteries.

* * * * *